United States Patent
Rahman et al.

(10) Patent No.: US 7,203,617 B1
(45) Date of Patent: Apr. 10, 2007

(54) METHOD OF DIAGNOSING A LOW RANGE LIMITING MALFUNCTION OF AN ENGINE COOLANT TEMPERATURE SENSOR

(75) Inventors: Mahfuzur Rahman, Belleville, MI (US); Kenneth M. Simpson, Swartz Creek, MI (US)

(73) Assignee: Delphi Technologies, Inc., Troy, MI (US)

( * ) Notice: Subject to any disclaimer, the term of this patent is extended or adjusted under 35 U.S.C. 154(b) by 0 days.

(21) Appl. No.: 11/234,408

(22) Filed: Sep. 23, 2005

(51) Int. Cl.
*G06F 11/00* (2006.01)
(52) U.S. Cl. ..................... 702/130; 374/100
(58) Field of Classification Search ............... 702/130, 702/132, 188; 374/1, 100
See application file for complete search history.

(56) References Cited

U.S. PATENT DOCUMENTS

| | | | | |
|---|---|---|---|---|
| 4,069,712 A | * | 1/1978 | Armstrong et al. | 73/118.1 |
| 5,792,949 A | * | 8/1998 | Hewelt et al. | 73/117.3 |
| 6,240,774 B1 | * | 6/2001 | Niki et al. | 73/118.1 |
| 2004/0173012 A1 | * | 9/2004 | Tsukamoto et al. | 73/118.1 |
| 2004/0232252 A1 | * | 11/2004 | Paul et al. | 237/28 |

* cited by examiner

*Primary Examiner*—Edward Raymond
(74) *Attorney, Agent, or Firm*—Paul L. Marshall

(57) ABSTRACT

Low range limiting malfunctions of an engine coolant temperature (ECT) sensor are diagnosed by comparing a change in the sensed temperature during engine operation with a calibrated temperature change. If the change in sensed temperature fails to exceed the calibrated temperature change, and a diagnostic for detecting a stuck ECT signal is either inconclusive or passed, a low range limiting malfunction of the sensor is indicated. If the diagnostic for detecting a stuck ECT signal is failed, the low range limiting diagnostic concludes with no report even if the change in sensed temperature fails to exceed the calibrated temperature change.

6 Claims, 5 Drawing Sheets

METHOD OF DIAGNOSING A LOW RANGE LIMITING MALFUNCTION OF AN ENGINE COOLANT TEMPERATURE SENSOR

TECHNICAL FIELD

The present invention relates to diagnosing the operation of an engine coolant temperature (ECT) sensor, and more particularly to a method of detecting a low range limiting sensor malfunction.

BACKGROUND OF THE INVENTION

Liquid-cooled internal combustion engines are commonly equipped with a sensor such as thermistor that is responsive to the temperature of the liquid coolant. In a typical motor vehicle application, the measured engine coolant temperature (ECT) is used for numerous control and diagnostic purposes such as identifying a cold-start condition of the engine. Since these control and diagnostic purposes can be frustrated by malfunctions of the ECT sensor, various diagnostic routines have been developed for verifying proper operation of the ECT sensor. One type of sensor malfunction that is particularly difficult to reliably diagnose is a low range limiting condition where the sensor output remains fixed for coolant temperatures below a certain value. This situation is graphically illustrated in FIG. 1, where the solid trace and dashed traces respectively represent the actual and measured coolant temperature over a period of time during which the engine is turned off and subsequently restarted. For example, the engine is turned off at time t0 and then restarted at time t2. In the illustration, the temperature sensor providing the measured coolant temperature is low range limited to approximately 70° C. In other words, the measured temperature faithfully tracks the actual coolant temperature until time t1 when the actual coolant temperature falls below 70° C. The measured coolant temperature remains fixed at 70° C. until time t3 when the actual coolant temperature rises above 70° C., whereafter the measured temperature faithfully tracks the actual coolant temperature. When this sort of temperature sensor malfunction occurs, the engine controller can fail to recognize a cold-start condition of the engine, for example, and various inappropriate control responses may result. Accordingly, what is needed is a method of diagnosing low range limiting malfunctions of an ECT sensor so that the driver of the vehicle may be prompted to have the vehicle serviced when such malfunctions occur.

SUMMARY OF THE INVENTION

The present invention provides an improved method of diagnosing low range limiting malfunctions of an engine coolant temperature (ECT) sensor by comparing a change in the sensed temperature during engine operation with a calibrated temperature change. If the change in sensed temperature fails to exceed the calibrated temperature change, and a diagnostic for detecting a stuck ECT signal is either inconclusive or passed, a low range limiting malfunction of the sensor is indicated. If the diagnostic for detecting a stuck ECT signal is failed, the low range limiting diagnostic concludes with no report even if the change in sensed temperature fails to exceed the calibrated temperature change.

DESCRIPTION OF THE PREFERRED EMBODIMENT

Figure 1:
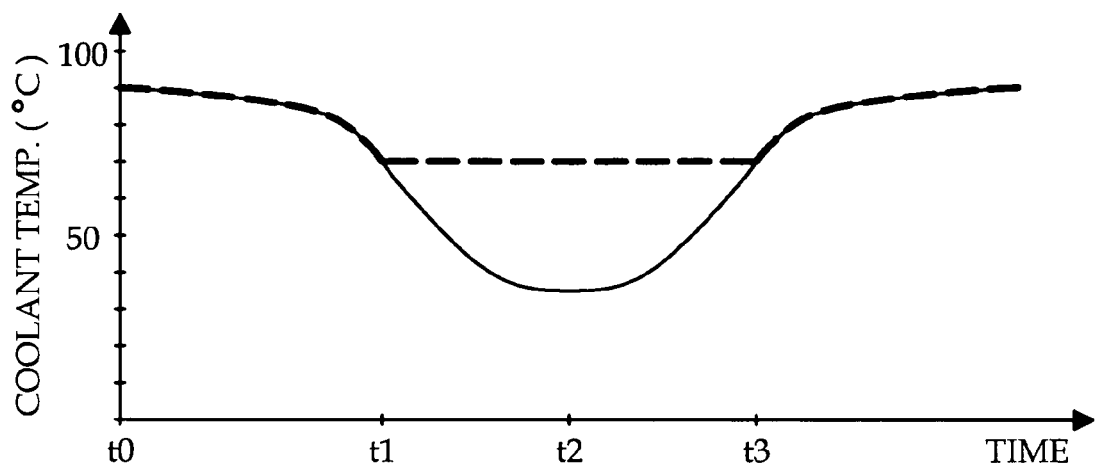
FIG. 1 is a graph depicting a low range limiting malfunction of an engine coolant temperature (ECT) sensor.
Figure 2:
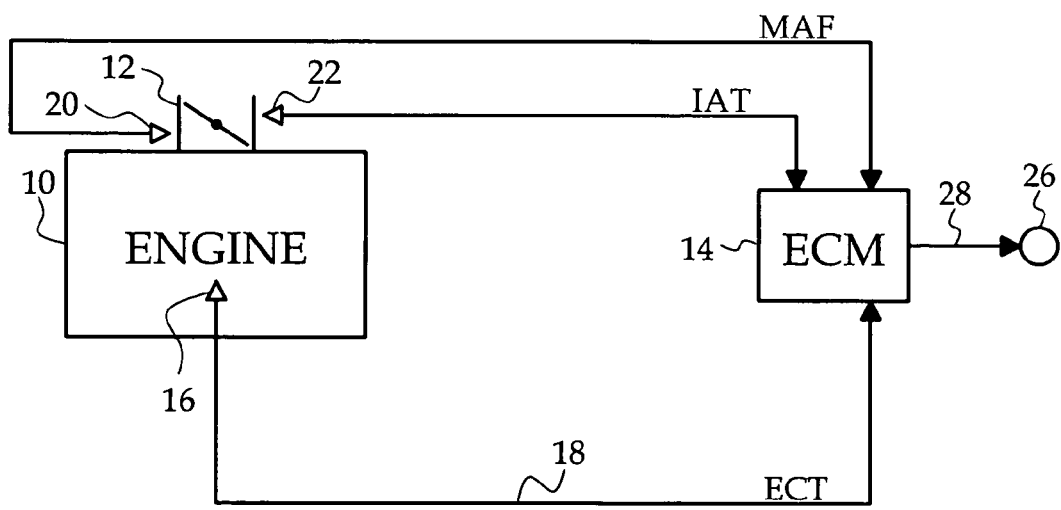
FIG. 2 is a diagram of an engine, an ECT sensor and a microprocessor-based engine control module (ECM) programmed to carry out the method of the present invention.

Referring to FIG. 2, the reference numeral 10 designates an internal combustion engine that is cooled in part by circulating a liquid coolant therethrough. Engine 10 includes a throttled intake manifold 12 through which ambient air is ingested for combustion with fuel. A microprocessor-based engine control module (ECM) 14 controls the fuel delivery and other engine-related control parameters such as spark timing and so forth. The control functions of ECM 14 are defined by a set of software routines such as represented by the flow diagram of FIG. 3, and the software routines in turn are responsive to input signals generated by various sensors. One such sensor is a temperature sensor 16 responsive to the temperature of the liquid coolant circulated through engine 10. The sensor 16 (referred to herein as the engine coolant temperature sensor, or ECT sensor) produces an engine coolant temperature (ECT) output signal on line 18, and ECM 14 utilizes the ECT signal for various purposes, such as distinguishing between a cold-start and a hot-start of engine 10. Range Low Limiting (RLL) malfunctions of the ECT sensor 16 such as described above in respect to FIG. 1 can cause the ECM 14 to fail to recognize a cold-start condition of engine 10, leading to various inappropriate control responses. For example, a RLL malfunction of ECT sensor 16 may prevent the execution of various diagnostic routines designed to be executed under cold-start conditions. As described below, the present invention is directed to a method in the form of a routine executed by the ECM 14 for diagnosing RLL malfunctions of ECT sensor 16, and instructing the engine operator (the driver of a vehicle, for example) to have the engine serviced. Other input signals used by routine include a mass air flow (MAF) signal produced by air flow sensor 20 and an intake air temperature (IAT) signal produced by the temperature sensor 22. If a RLL malfunction of ECT sensor 16 is detected, ECM 14 activates an alert device 26 such as a warning lamp via line 28.

Figure 3:
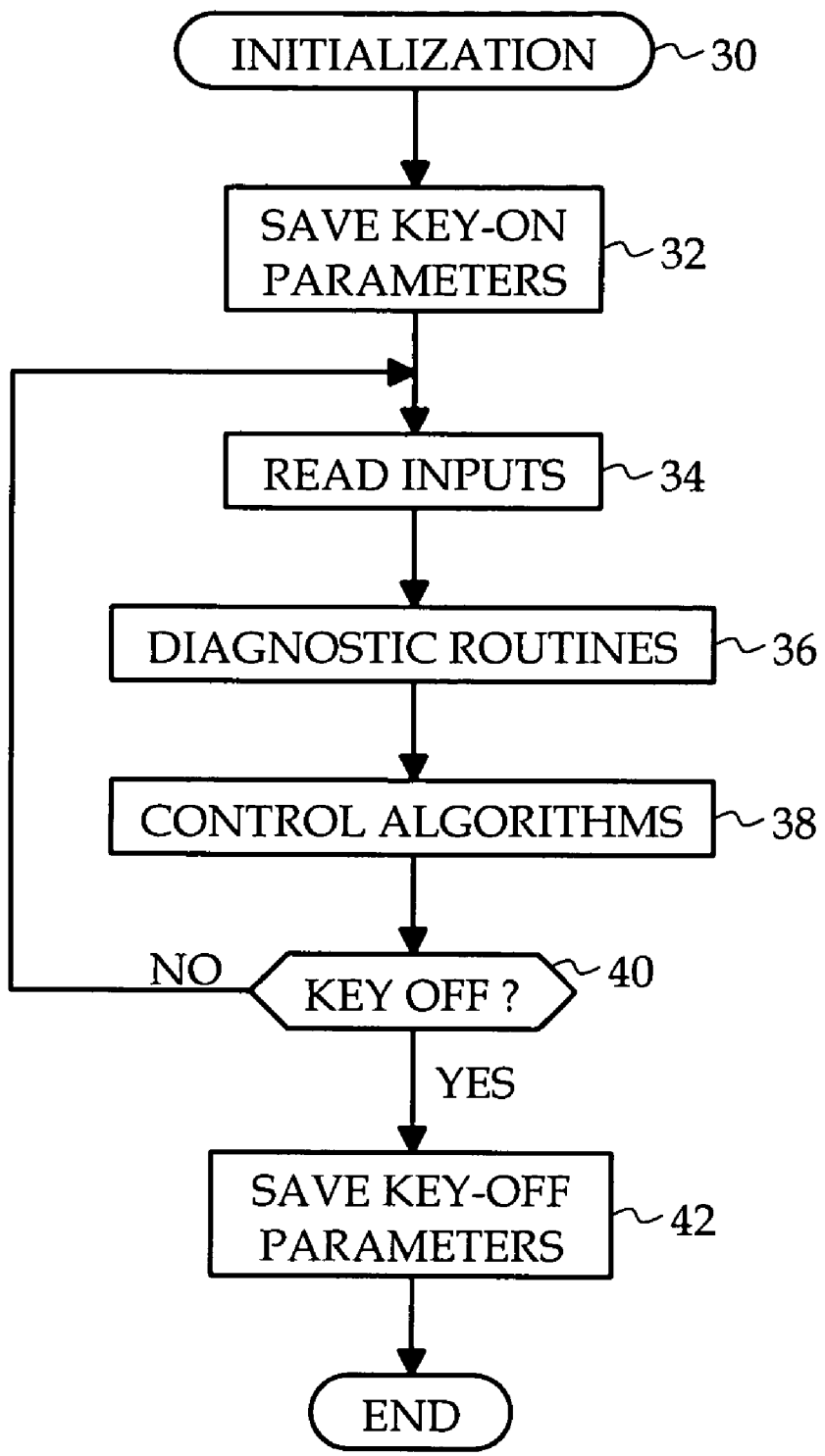
FIG. 3 is a high level flow diagram representing a set of software routines executed by the ECM of FIG. 2.

The main flow diagram of FIG. 3 includes a number of routines executed by ECM 14 during operation of the engine 10. The blocks 30 and 32 designate various routines executed at the initiation of a period of engine operation— that is, at power-up or key-on. For example, various parameters and flags are initialized to default values, and initial values of various input signals (i.e., key-on parameters) are stored for future use. In the case of the present invention, for example, the block 32 operates to store the initial temperature (referred to herein as ECT_STARTUP) provided by ECT sensor 16. Thereafter, the blocks 34, 36 and 38 are repeatedly executed until block 40 detects a power-down or key-off condition. Block 34 designates one or more routines for sampling and processing the various input signals supplied to ECM 14, block 36 designates a number of diagnostic routines including the ECT_STUCK and ECT_RLL diagnostic routines described below, and block 38 designates a number of control algorithms for controlling the operation of engine 10. At power-down or key-off, the block 42 is executed to store final or key-off values of various input signals for use in a subsequent period of engine operation.

Figure 4:
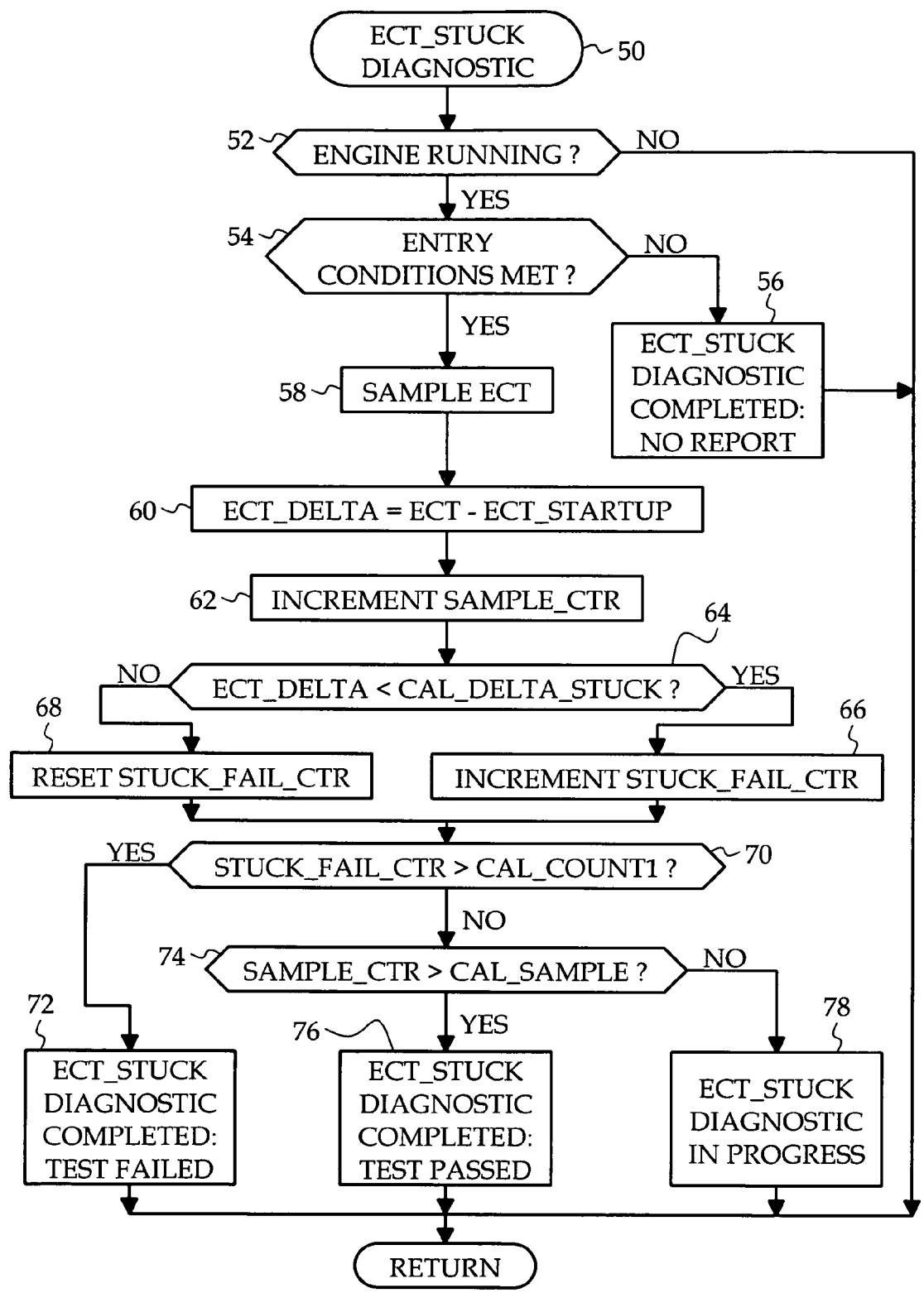
FIG. 4 is a flow diagram of a diagnostic routine executed by the ECM of FIG. 2 for detecting a stuck malfunction of the ECT sensor of FIG. 2.
Figure 5A:
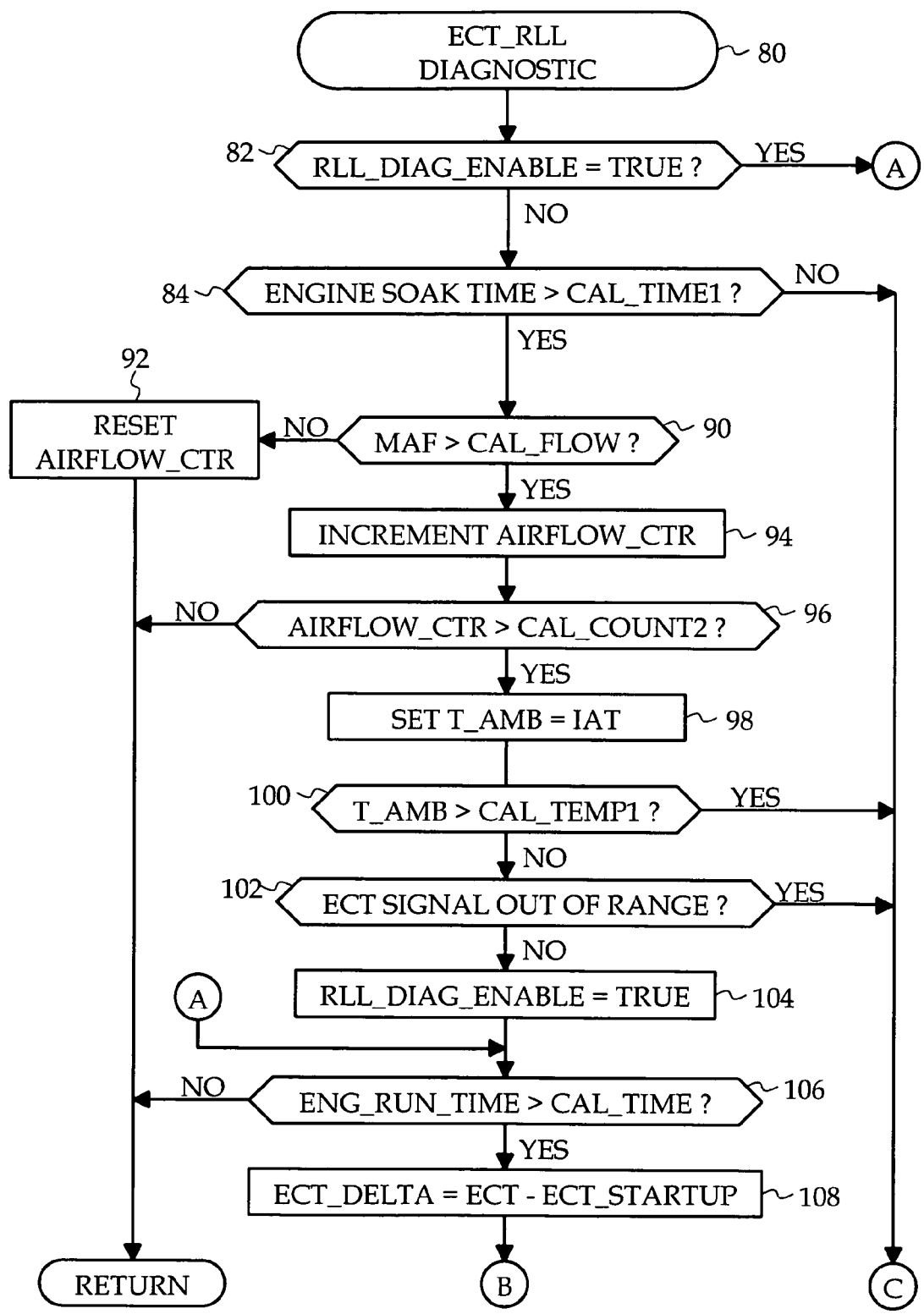
FIGS. 5A and 5B together form a flow diagram of a diagnostic routine executed by the ECM of FIG. 2 for detecting a low range limiting malfunction of the ECT sensor of FIG. 2 according to the present invention.
Figure 5B:
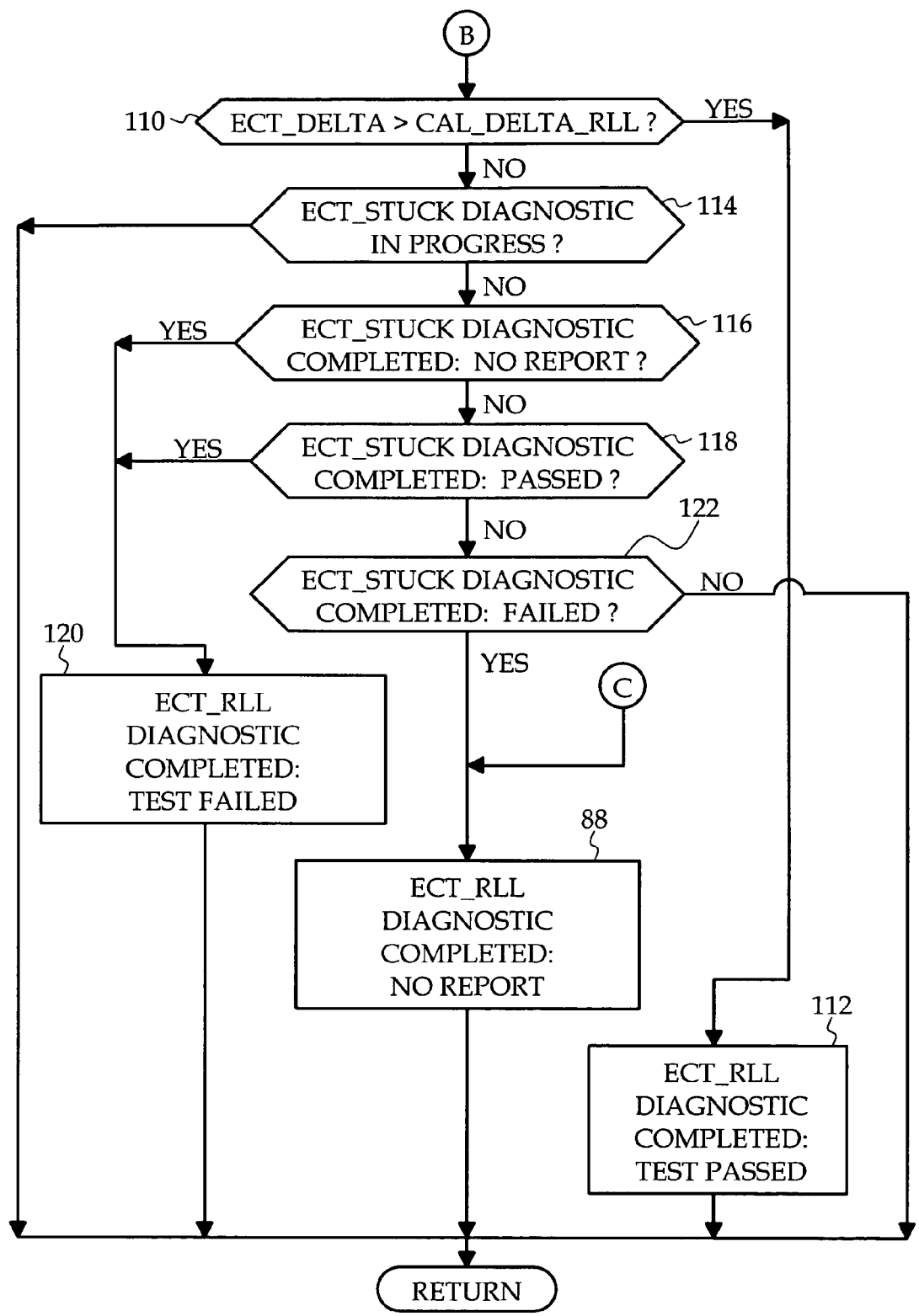

The flow diagrams of FIGS. 4 and 5A–5B describe diagnostic routines for detecting two different but related malfunctions of the ECT sensor 16. The ECT_STUCK diagnostic 50 of FIG. 4 is designed to detect a stuck condition—that is, a sensor malfunction in which the ECT signal on line 18 is permanently stuck at a fixed value. Possible output states of the ECT_STUCK diagnostic 50 include: inconclusive (i.e., no report), test failed, test passed and test in progress. The ECT_RLL diagnostic 80 of FIGS. 5A–5B is designed to detect a low range limiting malfunction such as described above in respect to FIG. 1, where the ECT signal on line 18 is temporarily stuck at a fixed value. Possible output states of the ECT_RLL diagnostic 80 include: inconclusive (i.e., no report), test failed and test passed.

In general, the ECT_STUCK diagnostic 50 of FIG. 4 diagnoses a stuck condition of ECT sensor 16 by monitoring the ECT signal during an initial operating period of the engine 10. If the sensor 16 is operating correctly, the ECT signal should consistently increase in value during the warm-up period of engine 10, as shown for example in the time interval t2–t3 of FIG. 1.

Referring to FIG. 4, the blocks 52 and 54 are first executed to determine if the engine 10 is running and if specified entry conditions for executing the diagnostic are met. If the engine 10 is not running, the routine is exited; if the engine 10 is running but the entry conditions are not met, the block 56 is executed to indicate that the ECT_STUCK diagnostic is completed but inconclusive (i.e., no report). The entry conditions of block 54 may require, for example, an engine soak time of at least a specified duration and an in-range value of the ECT signal. If blocks 52 and 54 are both answered in the affirmative, the blocks 58 and 60 are executed to sample the ECT signal and to compute a temperature difference ECT_DELTA by subtracting the stored initial ECT signal ECT_STARTUP from the sampled ECT signal. The block 62 increments a counter SAMPLE_CTR to keep track of the number of samples obtained by the routine, and the block 64 compares the temperature difference ECT_DELTA to a calibrated temperature difference CAL_DELTA_STUCK. If ECT_DELTA<CAL_DELTA_STUCK, the block 66 is executed to increment a counter STUCK_FAIL_CTR; otherwise, the block 68 resets the counter to zero. Block 70 compares the count of STUCK_FAIL_CTR to a calibrated count CAL_COUNT1. If the count exceeds CAL_COUNT1 (i.e., if ECT_DELTA has failed to exceed CAL_DELTA_STUCK for at least CAL_COUNT1 successive executions of the routine 50), a stuck condition is detected, and the block 72 is executed to indicate that the ECT_STUCK diagnostic 50 is completed and that the ECT sensor 16 failed the test. If STUCK_FAIL_CTR≦CAL_COUNT1, block 70 is answered in the negative, and block 74 compares the sample counter SAMPLE_CTR to a calibrated number of samples CAL_SAMPLE. If the count exceeds CAL_SAMPLE (i.e., if STUCK_FAIL_CTR failed to exceed CAL_COUNT1 within CAL_SAMPLE samples of the ECT signal), a stuck condition is not detected, and the block 76 is executed to indicate that the ECT_STUCK diagnostic 50 is completed and that the ECT sensor 16 passed the test. On the other hand, if SAMPLE_CTR≦CAL_SAMPLE, the block 78 is executed to indicate that the ECT_STUCK diagnostic 50 is still in progress.

The ECT_RLL diagnostic 80 of FIGS. 5A–5B also monitors a temperature difference ECT_DELTA, and utilizes the output state of the ECT_STUCK diagnostic 50 to distinguish between temporary and permanent stuck conditions of the ECT sensor 16. Referring to FIGS. 5A–5B, the block 82 is first executed to determine if the ECT_RLL diagnostic has been enabled, as indicated by the status of the RLL_DIAG_ENABLE flag. Initially, of course, the flag is FALSE, and the block 82 is answered in the negative. The blocks 84 and 90–102 define a series of entry conditions for the ECT_RLL diagnostic 80; if the entry conditions are met, the block 104 is executed to set the flag RLL_DIAG_ENABLE to TRUE so that block 82 will be answered in the affirmative in the next execution of the routine. The block 84 checks for an engine soak time of at least a calibrated duration CAL_TIME1. If the engine soak time is too short (i.e., less than or equal to CAL_TIME1), the block 88 is executed to indicate that the ECT_RLL diagnostic 80 is completed but inconclusive (i.e., no report).

If block 84 is answered in the affirmative, the blocks 90–100 are executed to determine if the ambient air temperature is too high to proceed with the diagnostic. In the illustrated embodiment, the ambient air temperature is inferred from the inlet air temperature sensor 22 after the engine 10 has run long enough to be drawing in fresh ambient air into intake manifold 12. Block 90 determines if the measured mass air flow (MAF) exceeds a calibrated flow CAL_FLOW. If not, the block 92 resets an airflow counter AIRFLOW_CTR; if so, the blocks 94 and 96 increment AIRFLOW_CTR and compare its count to a calibrated count CAL_COUNT2. Once the count of AIRFLOW_CTR exceeds CAL_COUNT2, the IAT signal is deemed to be representative of ambient air, and the block 98 sets the ambient temperature variable T_AMB equal to the current value of IAT. Block 100 compares T_AMB to a calibrated temperature CAL_TEMP1. If T_AMB>CAL_TEMP1, the ambient air temperature is too high for reliable diagnosis of a low range limiting malfunction of the ECT sensor 16, and the block 88 is executed to indicate that the ECT_RLL diagnostic 80 is completed but inconclusive (i.e., no report). If T_AMB≦CAL_TEMP1, the block 102 determines if the ECT signal is in range. If the ECT signal is in range, the block 104 sets the RLL_DIAG_ENABLE flag to TRUE.

Once the various entry conditions defined by blocks 84 and 90–102 have been met and the RLL_DIAG_ENABLE flag has been set to TRUE, the block 106 compares the engine run time ENG_TUN_TIME to a calibrated time CAL_TIME to determine if the engine 10 has been running long enough to raise the temperature of its coolant. Once ENG_RUN_TIME exceeds CAL_TIME, the block 108 is executed to compute the temperature difference ECT_DELTA by subtracting the stored initial ECT signal ECT_STARTUP from the current ECT signal. If ECT_DELTA exceeds a calibrated temperature delta CAL_DELTA_RLL, the block 110 signals the execution of block 112 for indicating that the ECT_RLL diagnostic 80 is completed and that the test was passed.

If the determined value of ECT_DELTA fails to exceeds the calibrated temperature delta CAL_DELTA_RLL after the engine run time requirement has been met, the blocks 114, 116, 118 and 122 determine what conclusion should be reached based on the status of the ECT_STUCK diagnostic 50. If the ECT_STUCK diagnostic is still in progress, no conclusion can be reached yet, and the block 114 directs ECM 14 to exit the routine. When the ECT_STUCK diagnostic 50 is completed, the block 116 determines if the diagnostic was inconclusive (i.e., no report). If so, block 120 is executed to indicate that the ECT_RLL diagnostic 80 is completed and that the test is failed. The same conclusion is reached if block 118 determines that the ECT_STUCK diagnostic 50 is completed and that the test was passed. However, if block 122 determines that the ECT_STUCK diagnostic 50 is completed and that the test was failed, no conclusion can be reached regarding a low range limiting malfunction, and the block 88 is executed to indicate that the ECT_RLL diagnostic 80 is completed but inconclusive (i.e., no report).

In summary, the method of the present invention reliably diagnoses low range limiting malfunctions of an ECT sensor and distinguishes such malfunctions from malfunctions in which the sensed temperature is stuck at some value. While the invention has been described with respect to the illustrated embodiment, it is recognized that numerous modifications and variations in addition to those mentioned herein will occur to those skilled in the art. For example, the ambient temperature may be determined with a separate ambient temperature sensor if desired, and so on. Accordingly, it is intended that the invention not be limited to the disclosed embodiment, but that it have the full scope permitted by the language of the following claims.

The invention claimed is:

1. A method of diagnosing low range limiting malfunctions of an engine coolant temperature sensor, comprising the steps of:
   sampling a first value of a signal produced by said sensor at an initiation of engine operation;
   sampling a second value of the signal produced by said sensor following an interval of engine operation;
   computing a temperature difference between said first and second values;
   periodically sampling said signal during an initial diagnostic interval to detect a stuck condition of said sensor;
   reporting an absence of low range limiting malfunctions if the computed temperature difference exceeds a calibrated temperature difference; and
   reporting a low range limiting malfunction if the computed temperature difference is less than said calibrated temperature difference and a stuck condition of said sensor is not detected during said initial diagnostic interval.

2. The method of claim 1, including the step of:
   reporting that the diagnosing of low range limiting malfunctions is inconclusive if the computed temperature difference is less than said calibrated temperature difference and a stuck condition of said sensor is detected during said initial diagnostic interval.

3. The method of claim 1, including the steps of:
   determining an ambient air temperature at the initiation of engine operation; and
   reporting that the diagnosing of low range limiting malfunctions is inconclusive if the determined ambient air temperature exceeds a calibrated temperature.

4. The method of claim 3, including the steps of:
   measuring a flow of intake air of said engine and a temperature of said intake air; and
   determining the ambient air temperature according to the measured temperature of intake air when the measured flow of intake air continuously exceeds a calibrated flow for at least a calibrated interval.

5. The method of claim 1, including the step of:
   reporting that the diagnosing of low range limiting malfunctions is inconclusive if the signal produced by said sensor is out of range.

6. The method of claim 1, including the step of:
   reporting that the diagnosing of low range limiting malfunctions is inconclusive if a soak time of said engine prior to said initiation of engine operation is less than a calibrated time.

* * * * *